(No Model.)
A. L. FELLOWS.
ROAD CART.
No. 363,221. Patented May 17, 1887.
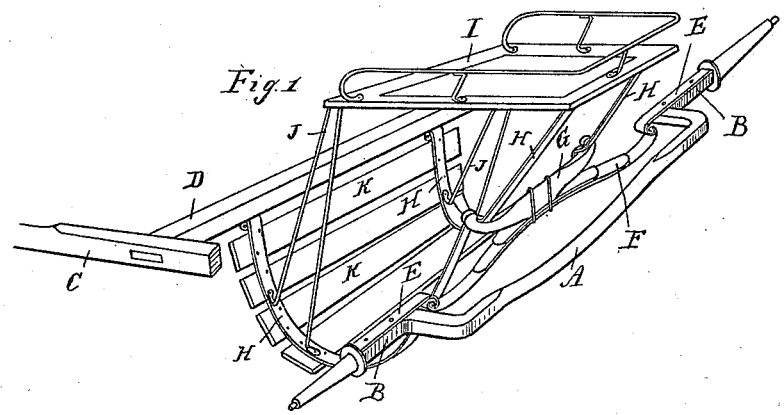
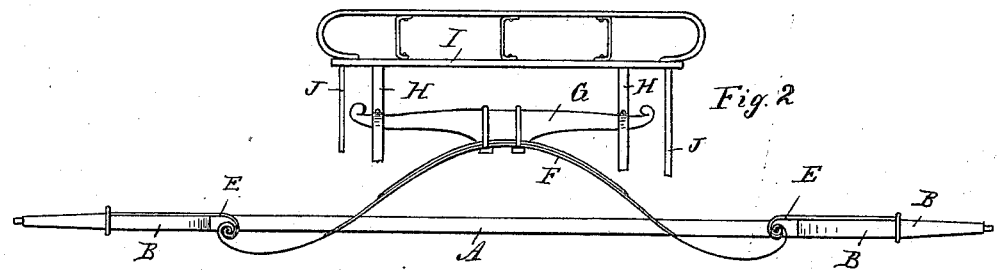
Attest:
John Schuman.
E. J. Scully.
Inventor:
Alvah L. Fellows.
by his Att'y

UNITED STATES PATENT OFFICE.

ALVAH L. FELLOWS, OF LITCHFIELD, MICHIGAN, ASSIGNOR OF TWO-THIRDS TO ALBERT J. LOVEJOY AND GEO. W. ROGERS, BOTH OF SAME PLACE.

ROAD-CART.

SPECIFICATION forming part of Letters Patent No. 363,221, dated May 17, 1887.

Application filed March 17, 1887. Serial No. 231,247. (No model.)

*To all whom it may concern:*

Be it known that I, ALVAH L. FELLOWS, of Litchfield, in the county of Hillsdale and State of Michigan, have invented new and useful Improvements in Road-Carts; and I do hereby declare that the following is a full, clear, and exact description thereof, reference being had to the accompanying drawings, which form a part of this specification.

This invention relates to certain new and useful improvements in the construction of that class of land-vehicles denominated "road-carts."

The object of the invention is to construct a cart wherein will be obviated as much as possible the imparting to the seat of that rocking horse motion so prevalent in vehicles of this class, and at the same time to leave the ingress to the vehicle free from obstructions.

To that end the invention consists in the peculiar construction of and means employed for supporting the seat without the use of the ordinary seat-bars, and in the peculiar construction, arrangement, and combination of the various parts, all as more fully hereinafter set forth and claimed.

Figure 1 is a rear perspective with the wheels removed. Fig. 2 is a front elevation with the shafts and wheels removed.

In the accompanying drawings, which form a part of this specification, A represents a rearwardly-arched axle, carrying the axle-arms B, upon which the wheels are mounted.

C are the shafts, and D the cross-bar of the same.

E are bars, preferably of spring metal, which are rigidly secured in any convenient manner, by clips or otherwise, to the axle-arms, and to the ends of these spring-arms E the ends of the seat-spring F are properly secured, preferably, however, without the so-called "link" or "shackle" coupling. To this spring F is secured a spring-bar, G.

H are spring metallic straps or bars, the forward ends of which are hinged to the cross-bar D of the shafts, from whence they extend in a curved line downwardly and rearwardly to the ends of the spring-bar G, to which they are rigidly secured, and thence they extend upwardly, as shown, and form supports for the rear corners of the seat I. The front of the seat is supported upon brace-bars J, the lower ends of which are rigidly secured to the straps or bars H.

K are cross-slats secured to the spring-straps H, to form the rack or boot.

By this construction it will readily be seen that the ordinary seat-bars, which extend rearwardly in a horizontal plane from the cross-bar to the axles, and over which a person must climb in order to mount the vehicle, are omitted, and also that the seat is supported upon a spring that in its longitudinal direction is in line with the axial center of the wheels.

A vehicle constructed as described will be found easy to mount and almost entirely free from "horse motion," which is so disagreeable to many persons.

What I claim as my invention is—

1. The combination, with the axle, the spring-bars E, secured to the upper side of the axle-arms, spring F, supported by the said spring-arms in axial line with the wheels, bar G, attached to said spring, and the seat, of the spring-bars H, secured between their ends to the bar G and at one end to the seat, substantially as and for the purpose specified.

2. The combination, with the axle, spring F, supported by the arms E, attached to the upper side of said axle in line with the axle-arms, spring-bar G, attached to said spring, the cross-bar D, and seat I, of the spring-bars H, hinged at one end to said cross-bar and at the other secured to said seat, and connected between their ends to the bar G, and the brace-bars J, connecting the bars H and the seat, substantially as and for the purpose specified.

ALVAH L. FELLOWS.

Witnesses:
GEO. W. ROGERS,
L. B. WOODARD.